United States Patent
Tseitlin et al.

(10) Patent No.: US 10,691,814 B2
(45) Date of Patent: *Jun. 23, 2020

(54) METHOD AND SYSTEM FOR IMPROVING SECURITY AND RELIABILITY IN A NETWORKED APPLICATION ENVIRONMENT

(71) Applicant: NETFLIX, INC., Los Gatos, CA (US)

(72) Inventors: Ariel Tseitlin, Sunnyvale, CA (US); Roy Rapoport, Pacifica, CA (US); Jason Chan, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/960,468

(22) Filed: Apr. 23, 2018

(65) Prior Publication Data
US 2018/0307849 A1 Oct. 25, 2018

Related U.S. Application Data

(63) Continuation of application No. 14/703,862, filed on May 4, 2015, now Pat. No. 9,953,173, which is a (Continued)

(51) Int. Cl.
H04L 29/06 (2006.01)
G06F 21/60 (2013.01)
(Continued)

(52) U.S. Cl.
CPC .............. *G06F 21/604* (2013.01); *G06F 9/50* (2013.01); *G06F 11/302* (2013.01); (Continued)

(58) Field of Classification Search
CPC ...... G06F 21/604; G06F 21/45; G06F 21/577; G06F 11/3051; G06F 11/302; (Continued)

(56) References Cited

U.S. PATENT DOCUMENTS 5,475,844 A * 12/1995 Shiramizu ............... G06F 9/505 713/1
5,893,115 A     4/1999 Lewis
(Continued)

FOREIGN PATENT DOCUMENTS

WO      02/17557 A1    2/2002
WO   2008/151925 A2   12/2008

OTHER PUBLICATIONS

Jerry Gao et al. "SaaS performance and scalability evaluation in clouds" Service Oriented System Engineering (SOSE), 2011 IEEE 6th International Symposium on IEEE, Dec. 12, 2011, pp. 61-71.

*Primary Examiner* — David Garcia Cervetti
(74) *Attorney, Agent, or Firm* — Artegis Law Group, LLP

(57) ABSTRACT

A security application manages security and reliability of networked applications executing collection of interacting computing elements within a distributed computing architecture. The security application monitors various classes of resources utilized by the collection of nodes within the distributed computing architecture and determine whether utilization of a class of resources is approaching a predetermined maximum limit. The security application performs a vulnerability scan of a networked application to determine whether the networked application is prone to a risk of intentional or inadvertent breach by an external application. The security application scans a distributed computing architecture for the existence of access control lists (ACLs), and stores ACL configurations and configuration changes in a database. The security application scans a distributed computing architecture for the existence of security certificates, places newly discovered security certificates in a database, and deletes outdated security certificates. Advantageously, security and reliability are improved in a distributed computing architecture.

40 Claims, 6 Drawing Sheets

Related U.S. Application Data continuation of application No. 13/445,872, filed on Apr. 12, 2012, now Pat. No. 9,027,141.

(51) Int. Cl.

| | |
|---|---|
| *G06F 16/28* | (2019.01) |
| *G06F 21/45* | (2013.01) |
| *G06F 21/57* | (2013.01) |
| *H04L 9/32* | (2006.01) |
| *H04L 12/26* | (2006.01) |
| *G06F 9/50* | (2006.01) |
| *H04L 12/24* | (2006.01) |
| *G06F 11/30* | (2006.01) |
| *G06F 21/00* | (2013.01) |
| *H04L 29/08* | (2006.01) |

(52) U.S. Cl.
CPC ........ *G06F 11/3051* (2013.01); *G06F 16/285* (2019.01); *G06F 21/00* (2013.01); *G06F 21/45* (2013.01); *G06F 21/577* (2013.01); *H04L 9/3268* (2013.01); *H04L 41/12* (2013.01); *H04L 43/16* (2013.01); *H04L 63/101* (2013.01); *H04L 63/1408* (2013.01); *H04L 63/1433* (2013.01); *G06F 2209/504* (2013.01); *G06F 2221/034* (2013.01); *G06F 2221/2141* (2013.01); *H04L 67/10* (2013.01); *Y02D 10/22* (2018.01)

(58) Field of Classification Search
CPC ....... G06F 2221/2141; G06F 2221/034; G06F 2209/504; H04L 63/1433; H04L 63/101; H04L 9/3268; H04L 43/16; H04L 63/1408; H04L 67/10
See application file for complete search history.

(56) References Cited

U.S. PATENT DOCUMENTS

| | | | |
|---|---|---|---|
| 6,185,185 B1 | 2/2001 | Basset et al. | |
| 6,363,411 B1* | 3/2002 | Dugan | H04M 3/42136 379/201.01 |
| 6,507,530 B1 | 1/2003 | Williams et al. | |
| 6,574,737 B1 | 6/2003 | Kingsford et al. | |
| 6,587,471 B1 | 7/2003 | Bass et al. | |
| 6,626,077 B1* | 9/2003 | Gilbert | F41H 13/0006 102/400 |
| 6,782,350 B1* | 8/2004 | Burnley | G06F 11/3419 702/186 |
| 7,155,714 B2* | 12/2006 | Makris | G06Q 10/00 717/176 |
| 7,181,769 B1* | 2/2007 | Keanini | H04L 63/1416 713/166 |
| 7,203,700 B1* | 4/2007 | Kumar | G06F 9/4868 |
| 7,249,070 B1* | 7/2007 | Burrell | G06Q 10/087 705/28 |
| 7,340,776 B2 | 3/2008 | Zobel et al. | |
| 7,450,511 B2 | 11/2008 | Jang | |
| 7,500,100 B1 | 3/2009 | Kobozev et al. | |
| 7,529,978 B2* | 5/2009 | Hasha | H05B 47/155 714/38.1 |
| 7,647,329 B1* | 1/2010 | Fischman | G06F 3/0607 707/999.1 |
| 7,684,429 B1 | 3/2010 | Pannell | |
| 7,702,899 B2 | 4/2010 | Kobozev et al. | |
| 7,707,075 B2* | 4/2010 | Vaughan | G06Q 10/02 705/28 |
| 7,761,917 B1 | 7/2010 | Kumar | |
| 7,783,506 B2* | 8/2010 | Vaughan | G06Q 10/02 705/26.8 |
| 7,925,666 B1* | 4/2011 | Johnson | G06F 21/604 707/781 |
| 7,979,907 B2 | 7/2011 | Schultz et al. | |
| 8,135,823 B2 | 3/2012 | Cole et al. | |
| 8,139,600 B1 | 3/2012 | Pannell | |
| 8,201,257 B1* | 6/2012 | Andres | G06F 21/568 726/23 |
| 8,250,654 B1* | 8/2012 | Kennedy | H04L 41/22 713/187 |
| 8,296,774 B2 | 10/2012 | Unnikrishnan et al. | |
| 8,327,128 B1 | 12/2012 | Prince et al. | |
| 8,365,089 B2 | 1/2013 | Pomerantz | |
| 8,374,968 B2* | 2/2013 | Etchegoyen | G06F 21/105 705/50 |
| 8,631,042 B2* | 1/2014 | Le | G06F 16/2477 707/796 |
| 8,769,644 B1 | 7/2014 | Eicken et al. | |
| 8,799,641 B1 | 8/2014 | Seidenberg et al. | |
| 8,811,177 B1* | 8/2014 | Toudeh-Fallah | H04L 41/5019 370/235 |
| 8,863,022 B2* | 10/2014 | Rhodes | G06F 11/349 714/46 |
| 9,178,785 B1* | 11/2015 | Massoudi | H04L 43/0817 |
| 9,292,825 B2* | 3/2016 | Chan | G06Q 10/087 |
| 9,317,692 B2* | 4/2016 | Elder | G06F 21/577 |
| 9,407,521 B1* | 8/2016 | Kulkarni | H04L 43/08 |
| 9,503,470 B2* | 11/2016 | Gertner | H04L 63/145 |
| 9,529,629 B2* | 12/2016 | Moloian | G06F 11/3051 |
| 2001/0007133 A1 | 7/2001 | Moriconi et al. | |
| 2002/0019798 A1 | 2/2002 | Gajendragadkar | |
| 2002/0075814 A1* | 6/2002 | Desai | H04L 12/2801 370/255 |
| 2002/0087882 A1* | 7/2002 | Schneier | G06F 21/552 726/23 |
| 2002/0112157 A1 | 8/2002 | Doyle et al. | |
| 2002/0147803 A1 | 10/2002 | Dodd et al. | |
| 2002/0178377 A1 | 11/2002 | Hemsath et al. | |
| 2003/0056116 A1* | 3/2003 | Bunker | H04L 43/00 726/25 |
| 2003/0101041 A1* | 5/2003 | Gabele | G01R 31/318357 703/22 |
| 2003/0110259 A1 | 6/2003 | Chapman et al. | |
| 2003/0125915 A1* | 7/2003 | Gabele | G06F 30/33 703/13 |
| 2003/0126472 A1* | 7/2003 | Banzhof | G06F 21/577 726/25 |
| 2003/0140249 A1* | 7/2003 | Taninaka | G06F 21/577 726/25 |
| 2003/0149714 A1 | 8/2003 | Casati et al. | |
| 2003/0195861 A1 | 10/2003 | McClure et al. | |
| 2003/0217039 A1* | 11/2003 | Kurtz | G02B 5/3083 |
| 2003/0225822 A1* | 12/2003 | Olson | G06F 9/5072 709/202 |
| 2004/0003039 A1 | 1/2004 | Humphrey et al. | |
| 2004/0003384 A1* | 1/2004 | Pechtchanski | G06F 11/3466 717/158 |
| 2004/0006704 A1* | 1/2004 | Dahlstrom | G06F 21/577 726/25 |
| 2004/0015728 A1* | 1/2004 | Cole | G02B 5/3083 726/23 |
| 2004/0054776 A1* | 3/2004 | Klotz | H04L 41/06 709/224 |
| 2004/0057389 A1* | 3/2004 | Klotz | H04L 41/12 370/252 |
| 2004/0059807 A1* | 3/2004 | Klotz | H04L 41/0631 709/223 |
| 2004/0078384 A1* | 4/2004 | Keir | G02B 5/3083 |
| 2004/0148505 A1 | 7/2004 | Qiu | |
| 2004/0220947 A1* | 11/2004 | Aman | G06F 11/3433 |
| 2004/0230529 A1 | 11/2004 | Tieu et al. | |
| 2004/0230594 A1 | 11/2004 | Flam et al. | |
| 2004/0255290 A1* | 12/2004 | Bates | G06F 11/0748 717/174 |
| 2005/0005169 A1* | 1/2005 | Kelekar | H04L 63/1408 726/4 |
| 2005/0010754 A1 | 1/2005 | Brendel | |
| 2005/0033957 A1 | 2/2005 | Enokida | |
| 2005/0060574 A1* | 3/2005 | Klotz | H04L 41/22 726/4 |

(56) References Cited

U.S. PATENT DOCUMENTS

| | | | |
|---|---|---|---|
| 2005/0060598 A1* | 3/2005 | Klotz | G06F 11/2257 714/4.2 |
| 2005/0066171 A1 | 3/2005 | Simon | |
| 2005/0069136 A1 | 3/2005 | Thornton et al. | |
| 2005/0071630 A1 | 3/2005 | Thornton et al. | |
| 2005/0074124 A1 | 4/2005 | Thornton et al. | |
| 2005/0076199 A1 | 4/2005 | Thornton et al. | |
| 2005/0076200 A1 | 4/2005 | Thornton et al. | |
| 2005/0076201 A1 | 4/2005 | Thornton et al. | |
| 2005/0076202 A1 | 4/2005 | Thornton et al. | |
| 2005/0076203 A1 | 4/2005 | Thornton et al. | |
| 2005/0076204 A1 | 4/2005 | Thornton et al. | |
| 2005/0076205 A1 | 4/2005 | Thornton et al. | |
| 2005/0078830 A1 | 4/2005 | Thornton et al. | |
| 2005/0081025 A1 | 4/2005 | Thornton et al. | |
| 2005/0081026 A1 | 4/2005 | Thornton et al. | |
| 2005/0081027 A1 | 4/2005 | Thornton et al. | |
| 2005/0081028 A1 | 4/2005 | Thornton et al. | |
| 2005/0081029 A1 | 4/2005 | Thornton et al. | |
| 2005/0091484 A1 | 4/2005 | Thornton et al. | |
| 2005/0107997 A1* | 5/2005 | Watts | G06F 11/3419 703/21 |
| 2005/0114653 A1 | 5/2005 | Sudia | |
| 2005/0138364 A1 | 6/2005 | Roskind et al. | |
| 2005/0149442 A1 | 7/2005 | Adams et al. | |
| 2005/0160480 A1* | 7/2005 | Birt | G06F 11/008 726/25 |
| 2005/0193430 A1* | 9/2005 | Cohen | G06F 21/577 726/25 |
| 2005/0216957 A1* | 9/2005 | Banzhof | H04L 63/02 726/25 |
| 2005/0268117 A1* | 12/2005 | Simon | H04L 63/168 713/193 |
| 2006/0015729 A1 | 1/2006 | Novack et al. | |
| 2006/0036720 A1* | 2/2006 | Faulk, Jr. | H04L 41/0622 709/223 |
| 2006/0089826 A1* | 4/2006 | Gabele | G06F 30/33 703/17 |
| 2006/0101517 A1* | 5/2006 | Banzhof | G06F 21/577 726/25 |
| 2006/0101518 A1* | 5/2006 | Schumaker | G06F 21/577 726/25 |
| 2006/0101519 A1* | 5/2006 | Lasswell | G06F 21/577 726/25 |
| 2006/0101520 A1* | 5/2006 | Schumaker | G06F 21/554 726/25 |
| 2006/0179136 A1* | 8/2006 | Loboz | G06F 11/3409 709/224 |
| 2006/0191012 A1* | 8/2006 | Banzhof | G06F 21/577 726/25 |
| 2006/0224402 A1* | 10/2006 | Hanna | G06Q 10/06 705/34 |
| 2006/0248529 A1* | 11/2006 | Loboz | G06F 11/3423 718/100 |
| 2006/0265713 A1* | 11/2006 | Depro | G06F 11/3409 718/104 |
| 2006/0294031 A1* | 12/2006 | Muller | G06Q 30/04 705/404 |
| 2007/0011319 A1 | 1/2007 | McClure et al. | |
| 2007/0083274 A1* | 4/2007 | Krauss | G06F 11/3409 700/4 |
| 2007/0100830 A1 | 5/2007 | Beedubail et al. | |
| 2007/0113272 A2 | 5/2007 | Oliphant | |
| 2007/0220294 A1* | 9/2007 | Lippett | G06F 1/3203 713/320 |
| 2007/0250935 A1 | 10/2007 | Zobel et al. | |
| 2007/0288647 A1 | 12/2007 | Humphrey et al. | |
| 2008/0016208 A1 | 1/2008 | Treinen | |
| 2008/0086633 A1 | 4/2008 | Anderson et al. | |
| 2008/0134237 A1 | 6/2008 | Tu et al. | |
| 2008/0172677 A1* | 7/2008 | Tripathi | G06F 9/4843 719/315 |
| 2008/0313642 A1* | 12/2008 | Karaoguz | G06F 9/5027 718/104 |
| 2009/0106348 A1* | 4/2009 | Banerjee | G06F 9/52 709/203 |
| 2009/0106843 A1* | 4/2009 | Kang | H04L 63/1433 726/25 |
| 2009/0119777 A1* | 5/2009 | Jeon | G06F 21/577 726/25 |
| 2009/0150857 A1* | 6/2009 | Srinivasan | G06F 30/33 717/104 |
| 2009/0150893 A1* | 6/2009 | Johnson | G06F 9/5088 718/104 |
| 2009/0172674 A1* | 7/2009 | Bobak | G06F 11/1482 718/101 |
| 2009/0235268 A1 | 9/2009 | Seidman et al. | |
| 2009/0248428 A1* | 10/2009 | Disciascio | G06Q 10/00 705/306 |
| 2009/0249493 A1* | 10/2009 | Disciascio | G06F 21/10 726/31 |
| 2009/0254992 A1 | 10/2009 | Schultz et al. | |
| 2009/0271769 A1* | 10/2009 | Krauss | G06F 11/3409 717/133 |
| 2009/0300641 A1* | 12/2009 | Friedman | G06F 11/3664 718/104 |
| 2009/0312983 A1* | 12/2009 | Lee | G06F 11/3409 702/180 |
| 2009/0316719 A1 | 12/2009 | Baron et al. | |
| 2009/0319783 A1 | 12/2009 | Thornton et al. | |
| 2010/0037233 A1* | 2/2010 | Armstrong | G06F 9/3851 718/104 |
| 2010/0057905 A1* | 3/2010 | Enscoe | G06F 11/302 709/224 |
| 2010/0106678 A1* | 4/2010 | Pietrek | G06F 11/3476 706/54 |
| 2010/0138931 A1 | 6/2010 | Thorley et al. | |
| 2010/0235654 A1* | 9/2010 | Malik | G06F 1/3209 713/300 |
| 2010/0251263 A1* | 9/2010 | Coelho | G06F 11/0748 719/314 |
| 2010/0257536 A1* | 10/2010 | Srinivasan | G06F 8/63 718/105 |
| 2010/0257610 A1* | 10/2010 | Hohl | G06F 21/51 726/25 |
| 2010/0269123 A1* | 10/2010 | Mejdrich | H04L 43/0817 719/318 |
| 2010/0275012 A1 | 10/2010 | Kido et al. | |
| 2010/0325418 A1 | 12/2010 | Kanekar | |
| 2010/0325429 A1 | 12/2010 | Saha et al. | |
| 2011/0022691 A1 | 1/2011 | Banerjee et al. | |
| 2011/0093847 A1* | 4/2011 | Shah | G06F 9/45558 718/1 |
| 2011/0119742 A1 | 5/2011 | Maguire | |
| 2011/0126003 A1 | 5/2011 | Engert | |
| 2011/0126168 A1* | 5/2011 | Ilyayev | G06F 9/5072 717/103 |
| 2011/0138368 A1* | 6/2011 | Krauss | G06F 11/3466 717/133 |
| 2011/0138469 A1* | 6/2011 | Ye | G06F 21/577 726/25 |
| 2011/0213965 A1 | 9/2011 | Fu et al. | |
| 2011/0271115 A1 | 11/2011 | Adams et al. | |
| 2011/0295999 A1 | 12/2011 | Ferris et al. | |
| 2011/0296402 A1* | 12/2011 | Heyman | G06F 21/10 717/176 |
| 2012/0054487 A1 | 3/2012 | Sun et al. | |
| 2012/0090026 A1 | 4/2012 | Andrews et al. | |
| 2012/0151596 A1 | 6/2012 | McClure et al. | |
| 2012/0166796 A1 | 6/2012 | Metke et al. | |
| 2012/0182999 A1 | 7/2012 | Pannell | |
| 2012/0311715 A1* | 12/2012 | Tal | G06F 21/552 726/25 |
| 2013/0067378 A1* | 3/2013 | Au | G06F 11/32 715/771 |
| 2013/0091577 A1* | 4/2013 | McGinley | G06F 21/00 726/25 |
| 2013/0104125 A1* | 4/2013 | Sarma | G06F 9/45558 718/1 |

(56) References Cited

U.S. PATENT DOCUMENTS

| | | |
|---|---|---|
| 2013/0111191 A1 | 5/2013 | Murray et al. |
| 2013/0148504 A1 | 6/2013 | Ungureanu |
| 2013/0166752 A1* | 6/2013 | Kim ................. G06F 9/5061 |
| | | 709/226 |
| 2013/0182714 A1 | 7/2013 | Vachharajani et al. |
| 2013/0185403 A1 | 7/2013 | Vachharajani et al. |
| 2013/0185586 A1 | 7/2013 | Vachharajani et al. |
| 2013/0198371 A1 | 8/2013 | Branson et al. |
| 2013/0227695 A1* | 8/2013 | Shankar ............ G06F 21/577 |
| | | 726/25 |
| 2013/0238895 A1 | 9/2013 | Dixon et al. |
| 2014/0082353 A1 | 3/2014 | Everhart et al. |
| 2014/0082365 A1 | 3/2014 | Everhart et al. |
| 2014/0082734 A1 | 3/2014 | Guarnieri et al. |
| 2014/0082736 A1 | 3/2014 | Guarnieri et al. |
| 2014/0189873 A1* | 7/2014 | Elder ............... H04L 63/1433 |
| | | 726/25 |
| 2015/0012497 A1 | 1/2015 | Clark et al. |
| 2017/0149816 A1* | 5/2017 | Kelekar ........... H04L 63/1408 |

* cited by examiner

METHOD AND SYSTEM FOR IMPROVING SECURITY AND RELIABILITY IN A NETWORKED APPLICATION ENVIRONMENT

CROSS-REFERENCE TO RELATED APPLICATIONS

This application is a continuation of the co-pending U.S. patent application titled, "METHOD AND SYSTEM FOR IMPROVING SECURITY AND RELIABILITY IN A NETWORKED APPLICATION ENVIRONMENT," filed on May 4, 2015 and having Ser. No. 14/703,862, which is a continuation of the co-pending U.S. patent application titled, "METHOD AND SYSTEM FOR IMPROVING SECURITY AND RELIABILITY IN A NETWORKED APPLICATION ENVIRONMENT," filed on Apr. 12, 2012 and having Ser. No. 13/445,872. The subject matter of this related application is hereby incorporated herein by reference.

BACKGROUND OF THE INVENTION

Field of the Invention

Embodiments of the present invention generally relate to distributed computing systems and methods, and more specifically to improving security and reliability in a networked application environment.

Description of Related Art

A broad variety of computing applications have been made available to users over computer networks. Frequently, a networked application may be provided using multiple interacting computing nodes within a distributed computing architecture. For example, a web site may be provided using a web server (running on one node within the distributed computing architecture) configured to receive requests from users for web pages. The requests can be passed to an application server (running on another node within the distributed computing architecture), which in turn processes the requests and generate responses passed back to the web server, and ultimately to the users.

Another example of a networked application includes a content distribution system used to provide access to media titles over a network. Typically, a content distribution system may include various servers such as access servers and content servers. Clients may connect to the servers using a content player, such as a gaming console, computing system, computing tablet, mobile telephone, or network-aware DVD player. The content server stores files (or "streams") available for download from the content server to the content player. Each stream may provide a digital version of various forms of video or other content, such as a movie, a television program, a sporting event, user generated content, or a staged or live event captured by recorded video. Users access the service by connecting to a web server, where a list of content is available. Once a request for a particular title is received, the title may be streamed to the client system over a connection to an available content server.

In systems such as these, various conditions may result in a reduction in security or reliability. In one example, certain maximum limits may be placed on various types of resources. Exceeding the limit for a given resource may result in reduced access to the networked application, up to and including complete loss of service. In another example, one or more portions of a networked application may be vulnerable to attack from external applications seeking to breach the security of the distributed computing architecture. In at least some cases, the vulnerabilities may not be easily detectable until the portions of the networked application are deployed within the distributed computing architecture. In yet another example, one or more access control lists (ACLs), such as security groups, may be established within the distributed computing architecture in order to specify which sources can communicate to which destinations over which communication ports. However, the distributed computing architecture may not provide a means to determine the configuration of the various ACLs or to monitor changes to ACL configurations over time. In yet another example, security certificates may be utilized to authenticate receivers of encrypted messages over networks to ensure that exchange of confidential information, such as passwords, remain secure. Such security certificates may expire at a specific time determined by the web application that created the certificate. In such a case, the security certificate must be replaced by a corresponding certificate with a later expiration date. Failure to replace a security certificate prior to the expiration date may result in rejection of further encrypted communications with the networked application and a corresponding loss of service. As the foregoing illustrates, what is needed is a more automated way to manage security and reliability within a networked application environment.

SUMMARY OF THE INVENTION

One embodiment of the invention disclosed herein provides a computer-implemented method for managing a distributed computing architecture. The method includes discovering a resource within the distributed computing architecture; determining a classification for the resource based on one or more classification criteria; determining whether the classification corresponds to a record within a database; and if the classification corresponds to a record within the database, then incrementing a counter associated with the record; or if the classification does not correspond to a record within the database, then initializing another record within the database that corresponds to the classification; and initializing another counter associated with other record.

Another embodiment of the invention disclosed herein provides a computer-implemented method for managing a distributed computing architecture. The method includes scanning a networked application within the distributed computing architecture for a security vulnerability; in response, detecting a first security vulnerability; comparing the first security vulnerability against a database that includes a listing of previously-discovered security vulnerabilities; and if the first security vulnerability is not listed within the database, then initializing a record within the database that corresponds to the first security vulnerability; or if the first security vulnerability is listed within the database, then updating the record within the database that corresponds to the first security vulnerability to indicate that the first security vulnerability was detected.

Another embodiment of the invention disclosed herein provides a computer-implemented method for managing a distributed computing architecture. The method includes discovering an ACL within the distributed computing architecture; determining whether the ACL corresponds to a first record within a database; and if the ACL corresponds to a record within the database, then determining that a configuration of the ACL differs from a configuration of the record; and initializing another record within the database that corresponds to the record and has the configuration of the ACL; or if the ACL does not correspond to a first record within the database, then initializing another record within the database that corresponds to the ACL and has the configuration of the ACL.

Another embodiment of the invention disclosed herein provides a computer-implemented method for managing a distributed computing architecture. The method includes discovering a first security certificate within the distributed computing architecture that includes a first identifying label and an expiration date; comparing the first security certificate with a plurality of security certificates that resides within a storage repository; determining that the first security certificate corresponds to a second security certificate that resides within the storage repository; deleting the second security certificate from the storage repository; and storing the first security certificate within the storage repository.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention. Further, particular embodiments of the invention are described using an example of a networked application used to stream movies, music, television programming, user generated content etc., over a data communications network to end-user client devices. However, it should be understood that embodiments of the invention may be adapted to discover and manage security and reliability for a broad variety of networked applications or services. Accordingly, references to a streaming media service are merely illustrative and not limiting.

Figure 1:
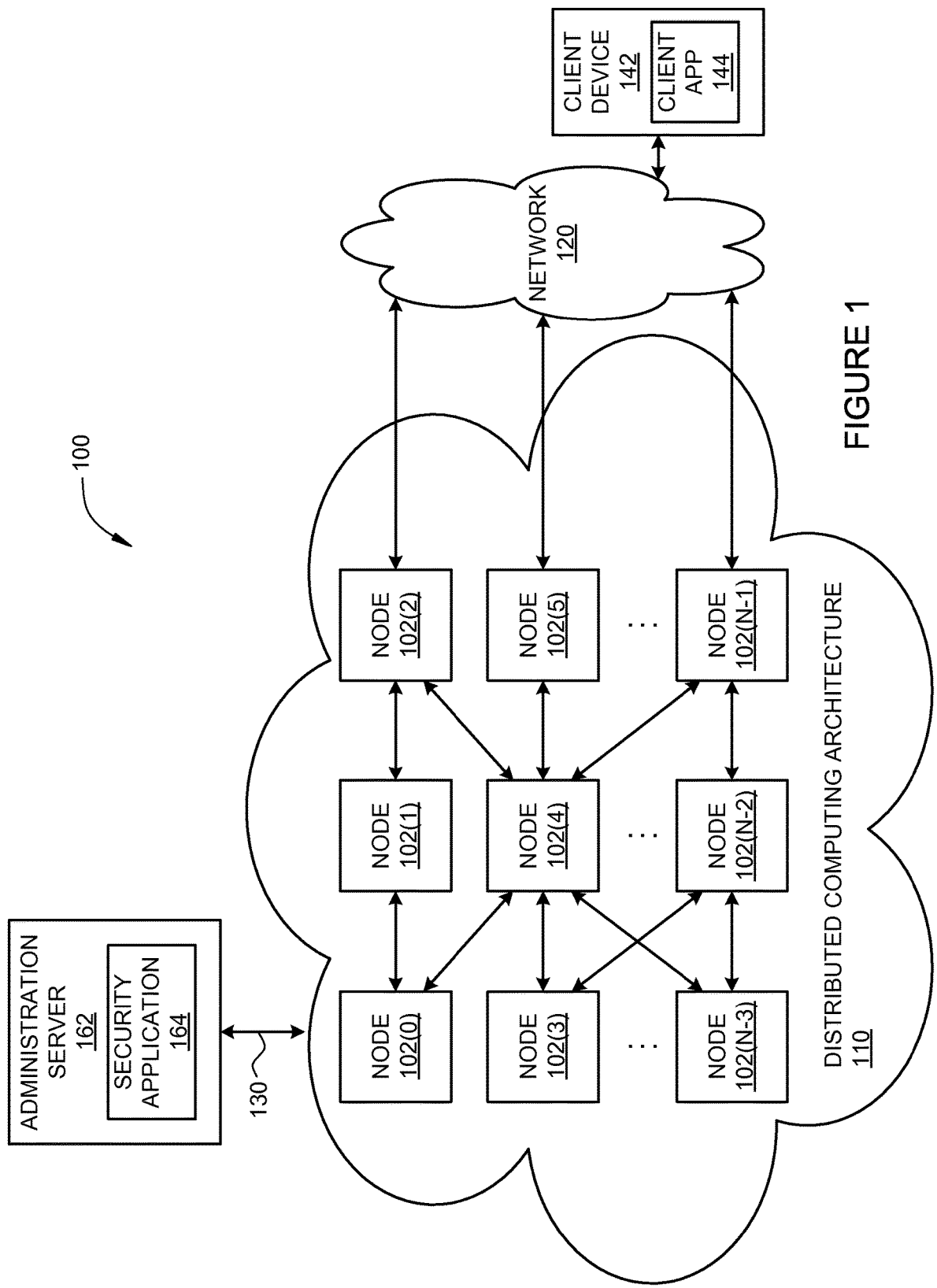
FIG. 1 illustrates a distributed computing system configured to implement one or more aspects of the present invention.

FIG. 1 illustrates a distributed computing system 100 configured to implement one or more aspects of the present invention. As shown, the distributed computing system 100 includes, without limitation, a distributed computing architecture 110 (also referred to herein as "the cloud"), a network 120, a client device 142, a communication channel 130, and an administration server.

The distributed computing architecture 110 includes a plurality of "compute nodes" 102 (referred to herein as nodes). Each of the nodes 102 may include a processor (CPU), a memory, a network interface controller (NIC), and one or more non-volatile storage devices such as a hard-disk drive, a magnetic tape drive, optical disk drives, a drive array (e.g., RAID), or the like. Each node 102 includes an operating system as well as one or more applications stored in memory and executing on the CPU. Some of the applications may provide a software framework for various cloud service architectures, such as a distributed database management system or a distributed application system. Such applications may execute on a single node 102. Applications may also execute on multiple nodes 102 where portions of the application run on different nodes 102. Alternatively, multiple instances of the application, where the instances execute on various nodes 102 within distributed computing system 100. The distributed computing architecture 110 provides one or more virtual computing services via standard messaging protocols, such as representational state transfer (REST). Examples of virtual computing services may include processing capacity, storage, and relational databases, among many other types of services. The virtual computing services may include networked applications where various active application components of the networked application execute on a plurality of nodes in communication with each other. For example, node 102(0) may execute one active application component of a networked application. Node 102(0) may communicate with node 102(4), where node 102(4) may execute a second active application component of the same networked application. Node 102(4) may communicate with nodes 102(2), 102(5), 102(N−1), where each of these nodes may execute an instance of a third active application component of the same networked application. The nodes 102 interconnect to each other through any technically feasible means. As described below, the distributed computing architecture connect to external devices and other computing systems via network 120 and communication channel 130.

The network 120 connects the distributed computing architecture 110 to external devices such as client device 142. The network 120 may include any technically feasible networking system such as a LAN (Local Area Network), a WAN (Wide Area Network), or the Internet.

The client device 142 is configured to access one or more applications executing within the distributed computing architecture 110. For example, the client device may access a content distribution system executing within the distributed computing architecture 110 to access media titles over network 120. In one embodiment, client computer 142 is maintained by a data analyst to analyze the distributed computing architecture 110. The client device 142 includes a processor (CPU), a memory, a NIC, and one or more non-volatile storage devices (not shown). Similar to nodes 102, client device 142 also includes an operating system as well as one or more applications, such as client application 144, stored in memory and running on the CPU. The client device 142 communicates with one or more of the nodes 102 via network 120 thereby allowing the client application 144 to access to or more networked applications executing on the distributed computing architecture 110.

The communication channel 130 connects one or more nodes 102 within the distributed computing architecture 110 to a computing system utilized for configuring, maintaining, and testing the distributed computing architecture 110 such as the administration server 162. The network 120 may include any technically feasible communication channel including a point-to-point connection, or a networking system such as a LAN (Local Area Network), a WAN (Wide Area Network), or the Internet.

The administration server 162 performs administrative tasks for the distributed computing architecture 110 autonomously or in response to one or more commands issued by a system administrator. The administration server 162 may be any type of computing device such as a personal computer, minicomputer or server. As shown, the administration server 162 may include one or more software applications that allow a system administrator to perform various functions including, without limitation, configuring, monitoring, and testing the distributed computing architecture 110.

In one embodiment, the administration server 162 includes a security application 164 that manages security and reliability within a networked application environment. As described in greater detail herein, the security application 164 manages resource limits, performs vulnerability scans, records configurations of ACLs, and discovers security certificates within a distributed computing architecture 110. The administration server 162 communicates to one or more of the nodes 102 via communication link 130.

Figure 2:
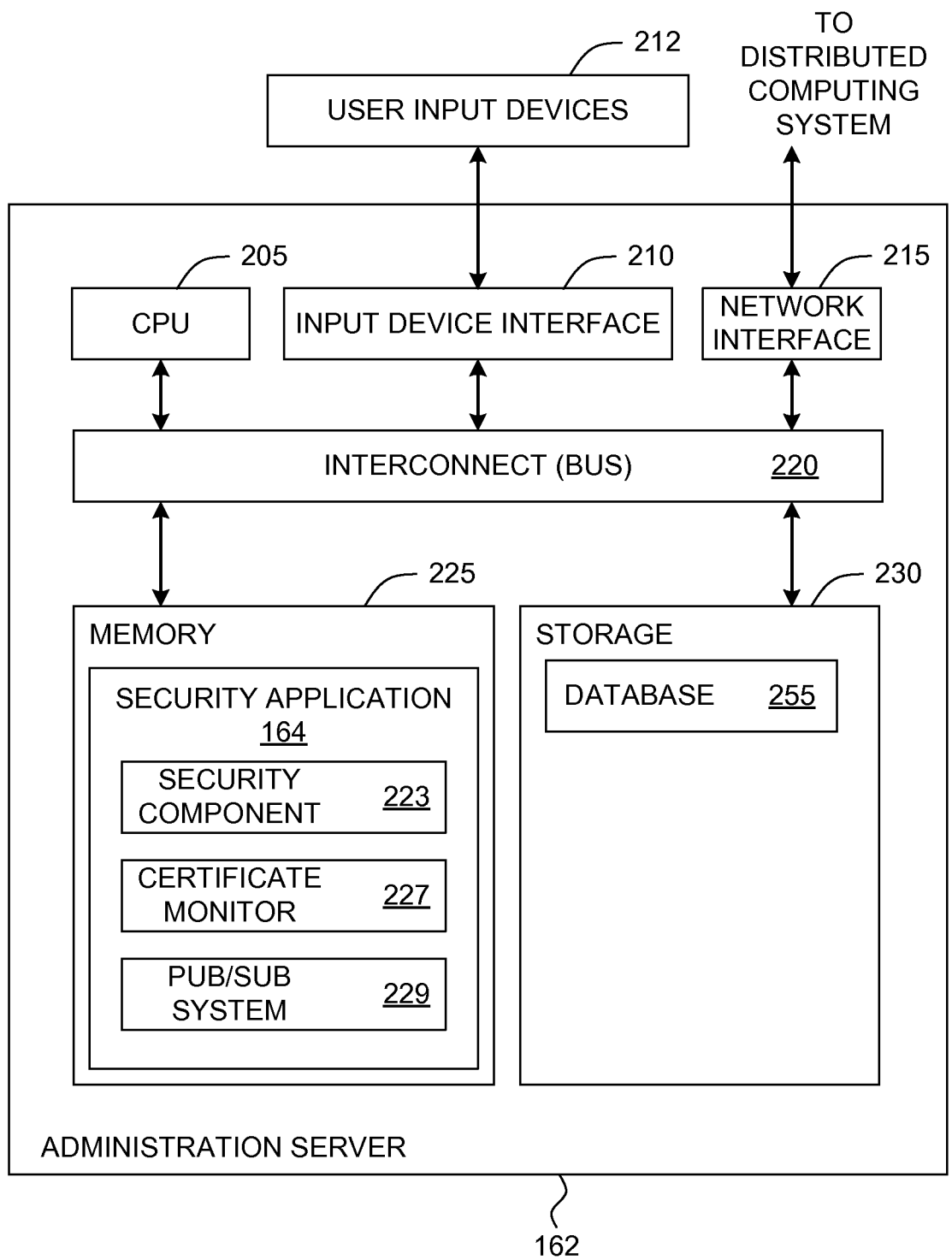
FIG. 2 illustrates the administration server of FIG. 1 which includes the security application, according to one embodiment of the invention.

FIG. 2 illustrates the administration server 162 of FIG. 1 which includes the security application 164, according to one embodiment of the invention. As shown, the administration server 162 includes, without limitation, a central processing unit (CPU) 205, an interconnect 220, a network interface 215, a memory 225, and storage 230. The administration server 162 may also include an I/O device interface 210 connecting I/O devices 212 (e.g., keyboard, display and mouse devices) to the administration server 162.

The CPU 205 is included to be representative of a single CPU, multiple CPUs, a single CPU having multiple processing cores, and the like. The CPU retrieves and executes programming instructions related to various application programs residing on the administration server 162. The CPU 205 is connected to other components within the administration server 162 via the interconnect 220. The interconnect 220 is a communications channel, such as a computer bus, to provide a means of communication among the various components within the administration server 162. The interconnect 220 facilitates transmission of programming instructions and application data between the CPU 205, network interface 215, memory 225, storage 230, and I/O devices interface 210. The network interface 215 provides a communication path between the administration server 162 and the distributed computing infrastructure 110. The memory 225 includes programming and instructions and application data for the administration server 162. Accordingly, the CPU 205 retrieves and executes programming instructions stored in the memory 225. Similarly, the CPU 205 stores and retrieves application data residing in the memory 225. The memory 225 is generally included to be representative of a random access memory. The storage 230 may be any device for long term storage of data such as a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN). The I/O device interface 210 connects I/O devices 212 (e.g., keyboard, display and mouse devices) to the administration server 162.

As shown, the memory 225 includes a security application 164 and storage 230 includes a database 255. The security application 164 includes a security component 223, a certificate monitor, and a publication/subscription (pub/sub) system 229. As noted above, the security application 164 is configured to manage security and reliability within a networked application environment.

The security component 223 executes instructions to perform the security and reliability functions described herein. The certificate monitor 227 discovers security certificates in the distributed computing architecture 110 and stores newly discovered certificates in the database 255. The pub/sub system 229 provides a platform to notify a system administrator and other authorized users of certain conditions as determined by security component 223. Typically, the security component 223 publishes a message to the pub/sub system 229. The system administrator and other authorized users who subscribe to the pub/sub system 229 receive notification of any messages published to the pub/sub system 229. In some embodiments, users choose to receive all messages published to the pub/sub system 229, or a subset of the messages based on one or more message classifications. Alternatively, the pub/sub system 229 may be implemented via other notification techniques, including, without limitation, generating automated emails to one or more users. The database 255 is a organized collection of the data utilized by the security application 164. It should be recognized that the database 255 may be implement via any technically feasible technique, including, without limitation, a relational database or a collection of data files.

In one embodiment, the security component 223 is configured to monitor various classes of resources utilized by the collection of nodes within the distributed computing architecture 110 and determine whether utilization of a class of resources is approaching a pre-determined maximum limit. The security component 223 scans the distributed computing architecture 110 to discover new system resources being utilized by one or more nodes 102. The security component 223 determines a classification for the newly discovered resource based on one or more classification criteria. For example, the newly discovered resource may be classified as an instance of a software program executing on the distributed computing architecture 110. The security component 223 searches the database 255 to determine whether a record exists for the classification. If a record exists for the classification, then the security component 223 increments a quantity corresponding to the record for that classification. If a record does not exist for the classification, then the security component 223 initializes a new record in the database corresponding to the new classification and increments a quantity corresponding to the record for the new classification. In this way, the security component 223 tracks, for each resource classification, the quantity of resources utilized within the distributed computing architecture 110. Because records for new classifications may be created as they are discovered, the security component 223 need not have an exhaustive list of classification types before scanning the distributed computing architecture 110 for resources.

The database also stores a maximum limit and one or more notification thresholds for each classification type. A system administrator or other authorized user may set these thresholds. In one embodiment, if the quantity of resources associated with a given classification exceeds the maximum limit, then one or more networked applications may cease to function or refuse further transaction. In order to prevent such an occurrence, one or more notification thresholds may be determined where each notification threshold is typically less than the maximum value. The notification threshold may be based on a specific quantity or on a percentage of the maximum limit. Multiple notification thresholds may be useful where a system administrator wishes to be notified when utilization of a classification of resources reaches 75% of the maximum limit and again when utilization reaches 90% of the maximum limit. The maximum limits, notification thresholds and current utilization levels are stored within the database 255 for each classification. In one embodiment, after incrementing a quantity corresponding to the record for a particular classification as described above, the security component compares the quantity utilized with the one or more notification thresholds. If the quantity utilized meets or exceeds a notification threshold, then the security component publishes a notification to the pub/sub system 229. System administrators subscribing to such notifications then receive a message that the notification threshold has been reached for the resource classification. In one embodiment, the security component publishes a notice to the pub/sub system 229 when a new resource classification is discovered that has no corresponding record in the database 255. In response, the system administrator may set a maximum limit and one or more notification thresholds associated with the new classification.

In another embodiment, the security component 223 performs a vulnerability scan of a networked application, such as an application implementing a website, to determine whether the networked application is prone to a risk of intentional or inadvertent breach by an external application. As a result of the vulnerability scan, the security component 223 could discover one or more security vulnerabilities. The security component 223 compares each discovered vulnerability with a list of vulnerabilities within the database 255. If the security vulnerability is not within the database 255, then the security component 223 initializes a record in the database 255 for the new vulnerability and stores information in the database 255 related to the vulnerability, including, without limitation, the date and time the vulnerability was discovered, the nature of the vulnerability, and the network application component exhibiting the vulnerability. If the security vulnerability is within the database 255, then the security component 223 updates the record in the database 255 associated with the vulnerability to reflect that the vulnerability was detected. In some embodiments, the database 255 is associated with an issue tracking system (not shown) configured to track whether one or more security vulnerabilities have been resolved. The system administrator utilizes the database 255 and the associated issue tracking system to manage the resolution of such discovered vulnerabilities. In one embodiment, the security component publishes a message to the pub/sub system 229 when a new record is initialized in the database 255 corresponding to a newly discovered vulnerability. In another embodiment, the security component publishes a message to the pub/sub system 229 when a vulnerability is marked in the database 255 as having been resolved, but is discovered during a subsequent vulnerability scan. In yet another embodiment, the security component publishes a message to the pub/sub system 229 when the distributed computing architecture 110 is currently being scanned for vulnerabilities.

In yet another embodiment, the security component 223 scans a distributed computing architecture 110 for the existence of access control lists (ACLs). An ACL specifies which users or system processes are granted access to objects, as well as what operations are allowed on given objects. One example of an ACL is a security group configured to specify which source objects can communicate to which destination objects over which communication ports within the distributed computing architecture 110. Source objects and destination objects may be identified as belonging to a particular ACL by various methods, including, without limitation, by an internet protocol (IP) address associated with the source or destination, or by an indicator associated with the source or destination identifying membership within a particular ACL. When an ACL is discovered, the security component 223 checks the database 255 to determine whether the database contains a record corresponding to the ACL. If the database does not have a record corresponding to the ACL, then the security component 223 initializes a record in the database 255 corresponding to the newly discovered ACL and stores the ACL's configuration information in the record. The configuration information includes, without limitation, the sources, destinations, and communication ports associated with the ACL, and the time and date when the ACL was discovered. If the database 255 does have a record corresponding to the ACL, then the security component 223 determines whether the current configuration differs from the most recent configuration corresponding to the ACL as stored in the database 255. If the current configuration of the ACL differs from the most recently stored configuration, then the security component stores the new configuration data in the record in the database 255 corresponding to the ACL. In some embodiments. The security component computes a quantity of instances of one or more software applications that execute within the ACL. In at least one embodiment, the security component computes an exposure metric based on the quantity of source objects, the quantity of communication ports, and the quantity of destination objects, and stores the metric in the record in the database 255 corresponding to the ACL.

In at least some embodiments, a system administrator or other authorized user determines one or more rules in order to discover potential system anomalies and security vulnerabilities. The rules are incorporated into the security application 164 in such a manner so as to configure the security application 164 to examine the characteristics of an ACL for conformance to the one or more rules. For example, a rule may specify that an ACL may not have a permission setting allowing source objects within the ACL to use an internet protocol (IP) address of 0.0.0.0/0, where an IP address of 0.0.0.0/0 grants access permission to all routable addresses on the Internet. In another example, a rule may not allow a user to share buckets or objects with a user account that is not a member of the ACL, where a bucket is a collection of objects such as computer files. The rule may specify that the ACLs are examined for the presence of unknown or unauthorized accounts within the ACL, where the unknown or unauthorized accounts have access to one or more buckets or objects associated with the ACL. In another example, a rule may prohibit certain permissive access rights within the ACL. An ACL may include an identity and access management system (IAM) enabling secure and controlled access to various services and resources available to objects associated with the ACL. The rule may prohibit certain access rights within the ACM for the purpose of preventing unauthorized access or use of the services and resources associated with the ACL. For example, the rule may prohibit access to certain buckets and objects associated with the ACL without a verified security credential that has been issued by a node 102 within the distributed computing architecture 110.

In yet another embodiment, the security component 223 causes a certificate monitor 227 to scan a distributed computing architecture 110 for the existence of security certificates, such as security certificates that conform to the secure sockets layer (SSL) cryptographic protocol. A security certificate is utilized to authenticate receivers of encrypted messages over networks to ensure that exchange of confidential information, such as passwords, remain secure. Such security certificates may expire at a specific time determined by the web application that created the certificate. Once a security certificate expires, further encrypted messages may not be received until an updated security certificate is acquired. The certificate monitor 227 discovers the security certificates by scanning by various methods. For example, the certificate monitor 227 scans a file folder associated with a source code control system, where the file folder may include security certificates associated with one or more versions of a software application. In another example, the certificate monitor 227 accesses network addresses on a port utilizing hypertext transfer protocol secure (HTTPS). The certificate monitor 227 may then receive one or more security certificates issued by a server corresponding to the accessed network addresses. The accessed network addresses may be associated with an elastic load balancing system configured to distribute network traffic related to a software application across multiple instances of the software application. In another example, the certificate monitor 227 scans the contents of one or more web pages where the server providing the content for the web pages issues a corresponding security certificate. It should be recognized that the examples above are not limiting and that other sources of security certificates may be monitored or scanned within the scope of the present invention.

Security certificates discovered by the certificate monitor 227 are typically associated with an identifying label and an expiration date. When the certificate monitor 227 discovers a security certificate, the certificate monitor 227 determines whether there is a corresponding security certificate in the database 255. For example, the certificate monitor 227 compares the identifying label of the newly discovered security certificate against the identifying labels of other security certificates recorded in the database 255. If the newly discovered certificate corresponds to a security certificate that resides in the database 255, then the certificate monitor 227 deletes the security certificate in the database 255. The certificate monitor 227 then stores the newly discovered security certificate in the database 255. In one embodiment, the certificate monitor 227 scans the security certificates recorded in the database 255, and publishes a message to the pub/sub system 229 identifying security certificates with an expiration date on or before a threshold date. In another embodiment, the certificate monitor 227 monitors the security certificates in the database 255 and deletes security certificates that have not been updated within a predetermined amount of time.

The certificate monitor 227 stores new security certificates in the database 255 as the new certificates are found. The security component 223 also finds updated security certificates and replaces the corresponding expiring security certificates with updated certificates.

Figure 3:
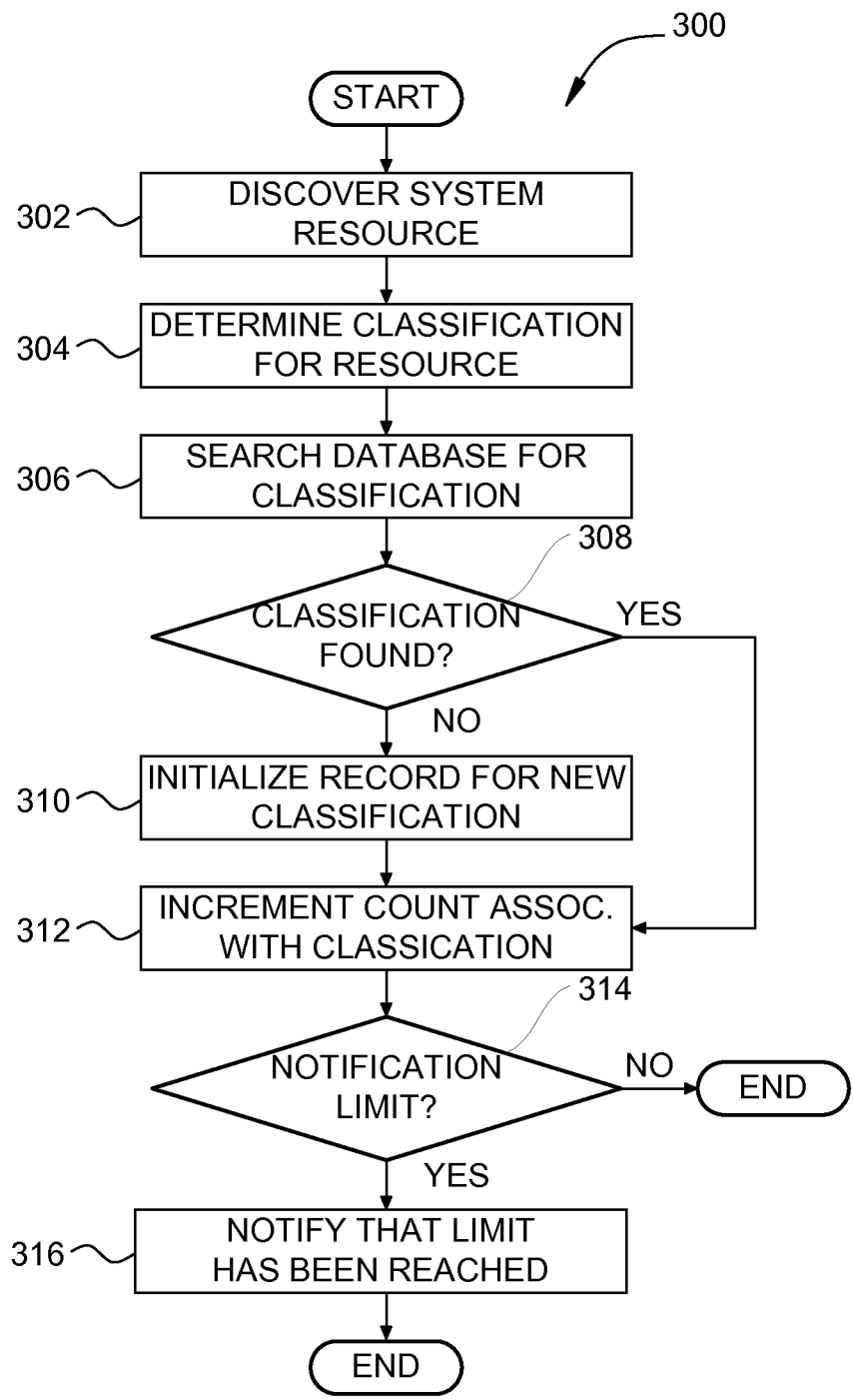
FIG. 3 sets forth a flow diagram of method steps for discovering resource utilization within a distributed computing architecture, according to one embodiment of the present invention.

FIG. 3 sets forth a flow diagram of method steps for discovering resource utilization within a distributed computing architecture 110, according to one embodiment of the present invention. Although the method steps are described in conjunction with the systems of FIGS. 1-2, persons skilled in the art will understand that any system configured to perform the method steps, in any order, is within the scope of the present invention.

As shown, a method 300 begins at step 302, where the security application 164 discovers a system resource that has not previously been recorded. At step 304, the security application 164 determines a classification for the resource based on one or more classification criteria. For example, the security application 164 may determine that a newly discovered resource is a as an instance of a software program executing on the distributed computing architecture 110. At step 306, the security application 164 searches the database 255 for the classification. At step 308, the security application 164 determines whether the classification corresponds to a record stored in the database 255.

If the classification does not correspond to a record stored in the database 255, then the method 300 proceeds to step 310, where the security application 164 initializes a record within the database 255 corresponding to the new classification. At step 312, the security application 164 increments a counter associated with the record. At step 314, the security application 164 determines whether a notification threshold associated with the classification has been reached.

If no notification threshold has been reached, then the method 300 terminates. However, if, in step 314, a notification threshold has been reached, then the method 300 proceeds to step 316, where the security application 164 notifies the system administrator that the notification threshold for the associated classification has been reached. The method 300 then terminates.

Returning now to step 308, if in step 308, the classification corresponds to a record stored in the database 255, then the method 300 proceeds to step 312, as described above.

Figure 4:
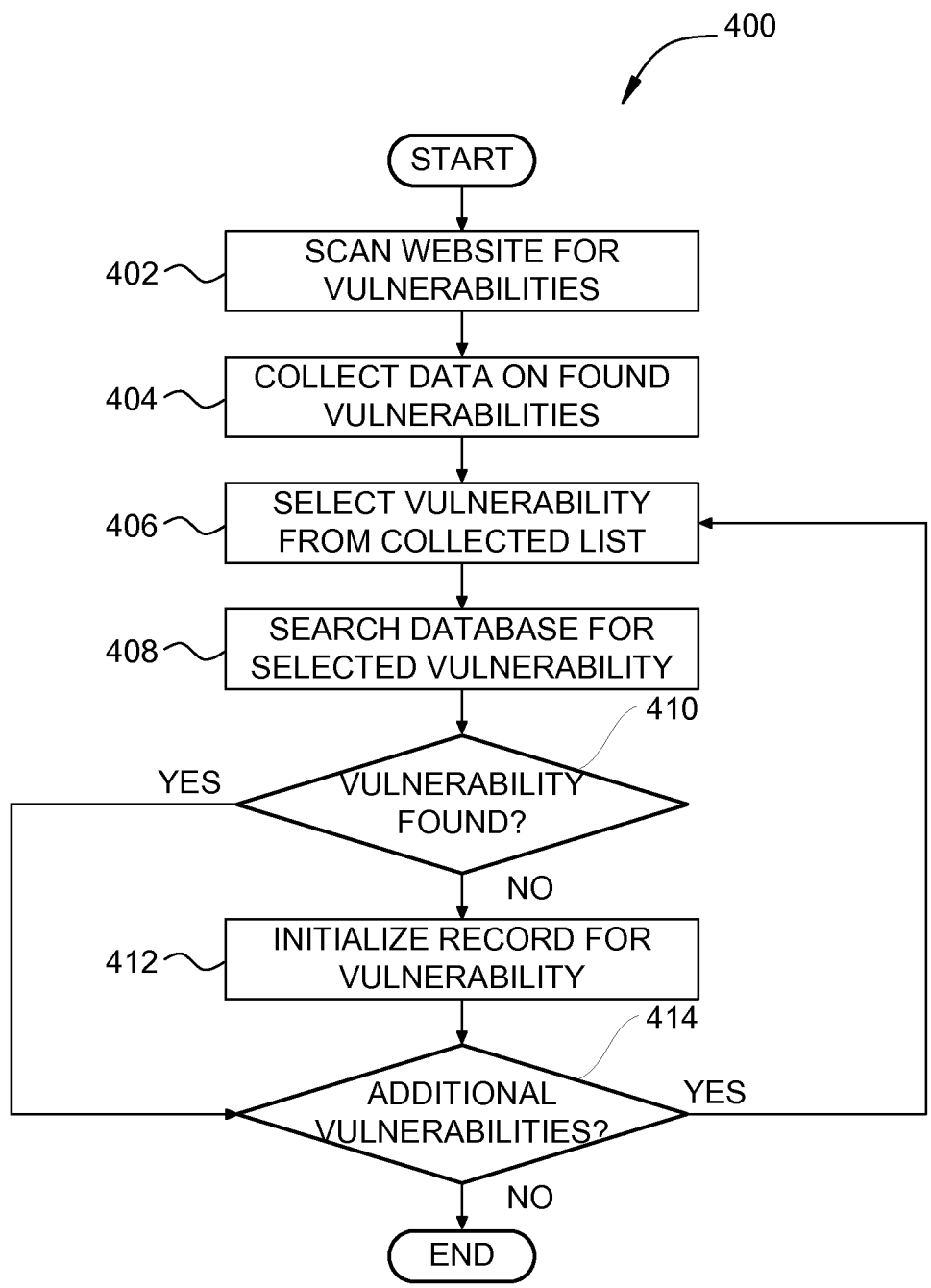
FIG. 4 sets forth a flow diagram of method steps for discovering security vulnerabilities within a distributed computing architecture, according to one embodiment of the present invention.

FIG. 4 sets forth a flow diagram of method steps for discovering security vulnerabilities within a distributed computing architecture 110, according to one embodiment of the present invention. Although the method steps are described in conjunction with the systems of FIGS. 1-2, persons skilled in the art will understand that any system configured to perform the method steps, in any order, is within the scope of the present invention.

As shown, a method 400 begins at step 402, where the security application 164 scans a networked application, such as an application implementing a website, for security vulnerabilities. At step 404, the security application 164 collects data on the found vulnerability such as the web page address exhibiting the vulnerability. At step 406, the security application 164 selects a security vulnerability from the list of vulnerabilities collected during the vulnerability scan. At step 408, the security application 164 compares the selected security vulnerability against the database 255 to search for a record corresponding to the selected vulnerability. At step 410, the security application 164 determines whether the selected vulnerability is listed in the database 255.

If the vulnerability is not listed within the database 255, then the method 400 proceeds to step 412, where the security application 164 initializes a record in the database 255 corresponding to the selected vulnerability. At step 414, the security application 164 determines whether there are additional vulnerabilities to process from the vulnerability scan. If there are additional vulnerabilities to process, then the method 400 returns to step 406, as described above. If there are no additional vulnerabilities to process, then the method 400 terminates.

Returning now to step 410, if, in step 410, the vulnerability is not listed within the database, then the method 400 proceeds to step 414, as described above.

Figure 5:
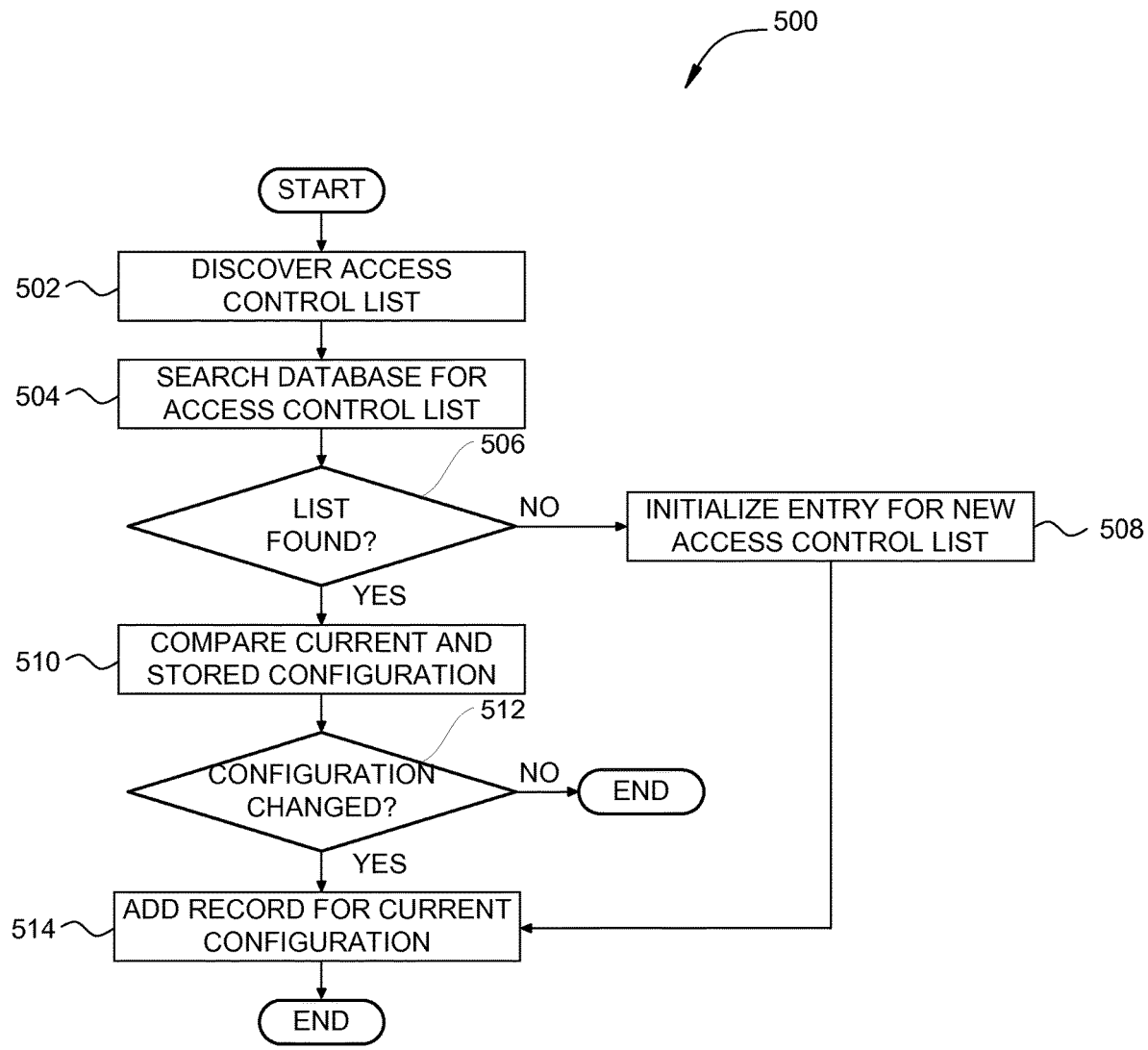
FIG. 5 sets forth a flow diagram of method steps for discovering access control lists (ACLs) within a distributed computing architecture, according to one embodiment of the present invention.

FIG. 5 sets forth a flow diagram of method steps for discovering access control lists (ACLs) within a distributed computing architecture 110, according to one embodiment of the present invention. Although the method steps are described in conjunction with the systems of FIGS. 1-2, persons skilled in the art will understand that any system configured to perform the method steps, in any order, is within the scope of the present invention.

As shown, a method 500 begins at step 502, where the security application 164 discovers an access control list (ACL), such as a security group. At step 504, the security application 164 searches the database 255 for the ACL. At step 506, the security application 164 determines whether the ACL is corresponds to a record within the database 255.

If the ACL does not correspond to a record within the database, then the method 500 proceeds to step 508, where the security application 164 initializes an entry in the database 255 corresponding to the newly discovered ACL. At step 514, the security application 164 initializes a record in the database 255 to store the configuration of the ACL. The method 500 then terminates.

Returning now to step 506, if, in step 506, the ACL corresponds to a record within the database 255, then the method 500 proceeds to step 510, where the security application 164 compares the current configuration of the ACL with the most recent configuration stored in the database 255 for the ACL. At step 512, the security application 164 determines whether the current configuration differs from the most recently stored configuration. If the configuration does not differ from the most recently stored configuration, then the method 500 terminates.

However, if, at step 512, the configuration differs from the most recently stored configuration, then the method 500 proceeds to step 514, where the security application 164 initializes a record in the database 255 to store the configuration of the ACL. The method 500 then terminates.

Figure 6:
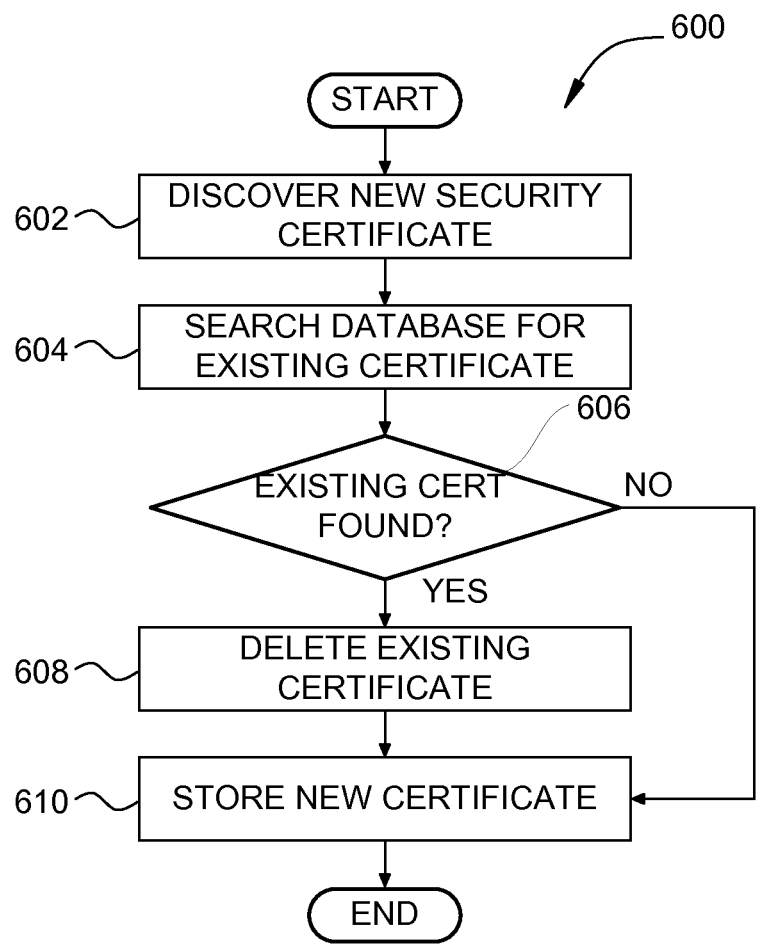
FIG. 6 sets forth a flow diagram of method steps for discovering security certificates within a distributed computing architecture, according to one embodiment of the present invention.

FIG. 6 sets forth a flow diagram of method steps for discovering security certificates within a distributed computing architecture 110, according to one embodiment of the present invention. Although the method steps are described in conjunction with the systems of FIGS. 1-2, persons skilled in the art will understand that any system configured to perform the method steps, in any order, is within the scope of the present invention.

As shown, a method begins at step 602, where the security application 164 discovers a new security certificate within the distributed computing architecture 110. The new security certificate typically includes an identifying label and an expiration date. At step 604, the security application 164 searches the database 255 or other storage repository for a corresponding security certificate with an earlier expiration date. At step 606, the security application 164 determines whether the existing certificate resides within the database 255. If the certificate does not reside within the database 255, then the method 600 proceeds to step 610, where the security application 164 stores the new certificate in the database 255. The method 600 then terminates.

However, if, in step 606, the certificate resides within the database 255, then the method 600 proceeds to step 608, where the security application 164 deletes the existing security certificate. At step 610, the security application 164 stores the new certificate in the database 255. The method 600 then terminates.

In sum, a security application is configured to manage security-related issues and reliability issues within a distributed computing architecture. In one aspect, the security application is configured to monitor various classes of resources utilized by the collection of nodes within the distributed computing architecture and determine whether utilization of a class of resources is approaching a predetermined maximum limit. The security application notifies a system administrator or other user if utilization of a class of resources meets or exceeds a notification threshold. In another aspect, the security application is configured to perform a vulnerability scan of a networked application, such as an application implementing a website, to determine whether the networked application is prone to a risk of intentional or inadvertent breach by an external application. The security application stores in a database data related to discovered vulnerabilities. In another aspect, the security application is configured to scan a distributed computing architecture for the existence of access control lists (ACLs) and store ACL configurations and configuration changes in a database. In yet another aspect, the security application is further configured to scan a distributed computing architecture for the existence of security certificates, place newly discovered security certificates in a database, and delete outdated security certificates.

One advantage of the disclosed techniques is that they improve the overall security and reliability within a distributed computing architecture. For example, the distributed computing architecture is regularly monitored for resource utilization levels, security vulnerabilities, and updated security certificates. The system administrator is notified when resource utilization levels reach a threshold value, a security vulnerability is discovered, or a security certificates is about to expire. Such notification allows the system administrator to take early corrective action. Another advantage is that the distributed computing architecture is regularly monitored for changes to access control lists (ACLs) such as security groups. Changes to ACL configurations are stored for subsequent review and analysis by a system administrator.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconduc-

What is claimed is:

1. One or more non-transitory computer-readable media including instructions that, when executed by one or more processors, cause the one or more processors to perform the steps of:
   discovering a resource associated with a distributed application, wherein the distributed application executes on a plurality of compute nodes, and the resource is discovered and monitored within a distributed computing architecture;
   determining, based on one or more classification criteria, a classification for the resource;
   determining whether the classification corresponds to an existing record stored within a database, wherein the existing record includes an existing counter of a quantity of the resource deployed in the distributed computing architecture;
   upon determining that the classification does not correspond to any existing record within the database, then:
      initializing a first record that corresponds to the classification,
      initializing a first counter that is included in first record,
      incrementing the first counter, and
      storing the first record in the database; and
   when the counter indicates that a utilization associated with the classification exceeds a pre-determined limit, publishing a first notification.

2. The one or more non-transitory computer-readable media of claim 1, wherein the resource comprises an instance of a software application executing within the distributed computing architecture.

3. The one or more non-transitory computer-readable media of claim 1, further comprising instructions that, when executed by the one or more processors, cause the one or more processors to perform the step of generating a second notification when the classification does not correspond to a record within the database.

4. The one or more non-transitory computer-readable media of claim 1, further comprising instructions that, when executed by the one or more processors, cause the one or more processors to perform the steps of:
   retrieving a first threshold value associated with the first record, and
   generating a second notification when the counter exceeds the first threshold value.

5. The one or more non-transitory computer-readable media of claim 4, wherein generating the second notification comprises publishing a message to a publication/subscription system indicating that the first counter exceeds the first threshold value.

6. The one or more non-transitory computer-readable media of claim 4, further comprising instructions that, when executed by the one or more processors, cause the one or more processors to perform the steps of:
   retrieving a second threshold value associated with the first record, and
   generating a third notification when the counter exceeds the second threshold value.

7. The one or more non-transitory computer-readable media of claim 6, wherein at least one of the first threshold value or the second threshold value comprises a percentage of a maximum limit.

8. A system, comprising:
   a memory storing instructions; and
   a processor that is couple to the memory and, when executing the instructions, is configured to perform the steps of:
      discovering a resource associated with a distributed application, wherein the distributed application executes on a plurality of compute nodes, and the resource is discovered and monitored within a distributed computing architecture;
      determining, based on one or more classification criteria, a classification for the resource;
      determining whether the classification corresponds to an existing record stored within a database, wherein the existing record includes an existing counter of a quantity of the resource deployed in the distributed computing architecture;
      upon determining that the classification does not correspond to ay existing record within the database, then:
         initializing a first record that corresponds to the classification,
         initializing a first counter that is included in the first record,
         incrementing the first counter, and
         storing the first record in the database; and
      when the counter indicates that a utilization associated with the classification exceeds a pre-determined limit, publishing a first notification.

9. The system of claim 8, wherein the resource comprises an instance of a software application executing within the distributed computing architecture.

10. The system of claim 8, wherein the processor also performs that step of generating a second notification when the classification does not correspond to a record within the database.

11. The system of claim 8, wherein the processor also performs the steps of:
   retrieving a first threshold value associated with the first record, and
   generating a second notification when the counter exceeds the first threshold value.

12. The system of claim 11, wherein generating the second notification comprises publishing a message to a publication/subscription system indicating that the first counter exceeds the first threshold value.

13. The system of claim 11, wherein the processor also performs the steps of:
   retrieving a second threshold value associated with the first record, and
   generating a third notification when the counter exceeds the second threshold value.

14. The system of claim 13, wherein at least one of the first threshold value or the second threshold value comprises a percentage of a maximum limit.

15. A method, comprising:
   scanning a distributed application that is executing on a plurality of compute nodes to detect a first security vulnerability, wherein the distributed application is stored within at least one memory element included in a distributed computing architecture;

comparing the first security vulnerability against a database that includes a listing of previously-discovered security vulnerabilities; and
upon determining that the first security vulnerability is not listed within the database, then:
initializing a first record that corresponds to the first security vulnerability, and
storing the first record in the database; or
upon determining that the first security vulnerability is listed within the database, then updating an existing record, which is stored within the database and corresponds to the first security vulnerability, to indicate that the first security vulnerability was detected;
determining that the first security vulnerability is marked as being resolved; and
generating a first notification that the first security vulnerability was resolved.

16. The method of claim 15, wherein the database includes an issue tracking system that is configured to track whether one or more security vulnerabilities have been resolved.

17. The method of claim 15, further comprising generating a second notification when the first record, corresponding to the first security vulnerability, is initialized.

18. The method of claim 17, wherein generating the second notification comprises publishing a message to a publication/subscription system indicating that the distributed computing architecture is being scanned for security vulnerabilities.

19. The method of claim 17, wherein generating the second notification comprises generating an automatic email indicating that the distributed computing architecture is being scanned for security vulnerabilities.

20. The method of claim 15, wherein scanning the distributed application further comprises generating a second notification that the distributed computing architecture is being scanned for security vulnerabilities.

21. A system, comprising:
a memory storing instructions; and
a processor that is coupled to the memory and, when executing the instructions, is configured to perform the steps of:
scanning a distributed application that is executing on a plurality of compute nodes to detect a first security vulnerability, wherein the distributed application is stored within at least one memory element included in a distributed computing architecture;
comparing the first security vulnerability against a database that includes a listing of previously-discovered security vulnerabilities; and
upon determining that the first security vulnerability is not listed within the database, then:
initializing a first record that corresponds to the first security vulnerability, and
storing the first record in the database; or
upon determining that the first security vulnerability is listed within the database, then updating an existing record, which is stored within the database and corresponds to the first security vulnerability to indicate that the first security vulnerability was detected;
determining that the first security vulnerability is marked as being resolved; and
generating a first notification that the first security vulnerability was resolved.

22. The system of claim 21, wherein the database includes an issue tracking system that is configured to track whether one or more security vulnerabilities have been resolved.

23. The system of claim 21, further comprising generating a second notification when the first record corresponding to the first security vulnerability is initialized.

24. The system of claim 23, wherein generating the second notification comprises publishing a message to a publication/subscription system indicating that the distributed computing architecture is being scanned for security vulnerabilities.

25. The system of claim 23, wherein generating the second notification comprises generating an automatic email indicating that the distributed computing architecture is being scanned for security vulnerabilities.

26. The system of claim 21, wherein scanning the distributed application further comprises generating a second notification that the distributed computing architecture is being scanned for security vulnerabilities.

27. A method, comprising:
discovering an access control list (ACL) associated with a distributed application executing on a plurality of compute nodes, wherein the ACL is stored within at least one memory element included in a distributed computing architecture;
determining whether the ACL corresponds to a first record within a database; and
upon determining that the ACL corresponds to a first an existing record within the database, then:
determining that a configuration of the ACL differs from a configuration of the existing first record; and
initializing, within the database, a first record that corresponds to the existing record, and has the configuration of the ACL; or
upon determining that the ACL does not correspond to a first any existing record within the database, then initializing a second the first record within the database that corresponds to the ACL, and has the configuration of the ACL.

28. The method of claim 27, wherein the ACL comprises a security group that includes:
one or more source objects,
one or more ports, and
one or more destination objects.

29. The method of claim 28, wherein the one or more source objects are identifiable via an internet protocol (IP) address.

30. The method of claim 28, wherein the one or more source objects are identifiable based on the one or more source objects included in the security group.

31. The method of claim 28, further comprising computing an exposure metric for the security group, wherein the exposure metric is based on at least one of:
a number of source objects included in the security group,
a number of ports included in the security group, or
a number of destination objects included in the security group.

32. The method of claim 28, further comprising analyzing the ACL to determine whether the ACL is associated with a permission setting that permits the security group to access all routable addresses on the Internet.

33. The method of claim 27, further comprising computing a number of instances of a software application that execute within the ACL.

34. One or more non-transitory computer-readable media including instructions that, when executed by one or more processors, cause the one or more processors to perform the steps of:

discovering an access control list (ACL) associated with a distributed application executing on a plurality of compute nodes, wherein the ACL is stored within at least one memory element included in a distributed computing architecture;

determining whether the ACL corresponds to a first record within a database; and upon determining that the ACL corresponds to a first an existing record within the database, then:

determining that a configuration of the ACL differs from a configuration of the existing record; and initializing, within the database, a first record that corresponds to the existing record, and has the configuration of the ACL; or upon determining that the ACL does not correspond to any existing record within the database, then initializing the first record within the database that corresponds to the ACL, and has the configuration of the ACL.

35. The one or more non-transitory computer-readable media of claim 34, wherein the ACL comprises a security group that includes:

one or more source objects, one or more ports, and one or more destination objects.

36. The one or more non-transitory computer-readable media of claim 35, wherein the one or more source objects are identifiable via an internet protocol (IP) address.

37. The one or more non-transitory computer-readable media of claim 35, wherein the one or more source objects are identifiable based on the one or more source objects included in the security group.

38. The one or more non-transitory computer-readable media of claim 35, further comprising instructions that, when executed by the one or more processors, cause the one or more processors to perform the step of computing an exposure metric for the security group, wherein the exposure metrics is based on at least one of:

a number of source objects included in the security group, a number of ports included in the security group, or a number of destination objects included in the security group.

39. The one or more non-transitory computer-readable media of claim 35, further comprising instructions that, when executed by the one or more processors, cause the one or more processors to perform the step of analyzing the ACL to determine whether the ACL is associated with a permission setting that permits the security group to access all routable addresses on the Internet.

40. The one or more non-transitory computer-readable media of claim 34, further comprising instructions that, when executed by the one or more processors, cause the one or more processors to perform the step of computing a number of instances of a software application that execute within the ACL.

\* \* \* \* \*

UNITED STATES PATENT AND TRADEMARK OFFICE
CERTIFICATE OF CORRECTION

PATENT NO. : 10,691,814 B2
APPLICATION NO. : 15/960468
DATED : June 23, 2020
INVENTOR(S) : Ariel Tseitlin, Roy Rapoport and Jason Chan It is certified that error appears in the above-identified patent and that said Letters Patent is hereby corrected as shown below:

In the Claims

Column 13, Claim 1, Line 30, please insert --the-- after in;

Column 14, Claim 8, Line 24, please delete "ay" and insert --any--;

Column 16, Claim 27, Line 29, please delete "a first";

Column 16, Claim 27, Line 32, please delete "first";

Column 16, Claim 27, Lines 36-37, please delete "a first";

Column 16, Claim 27, Line 38, please delete "a second";

Column 17, Claim 34, Line 11, please delete "a first".

Signed and Sealed this
Twenty-second Day of September, 2020

Andrei Iancu
*Director of the United States Patent and Trademark Office*